(12) United States Patent
Huang et al.

(10) Patent No.: US 9,264,865 B2
(45) Date of Patent: Feb. 16, 2016

(54) EFFICIENT GROUP MESSAGE DELIVERY METHOD FOR A2P AND M2M

(71) Applicants: Verizon Patent and Licensing Inc., Basking Ridge, NJ (US); Cellco Partnership, Basking Ridge, NJ (US)

(72) Inventors: Ye Huang, San Ramon, CA (US); Chi Kit Ben Lo, Danville, CA (US); Wei Guang Tan, San Jose, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 53 days.

(21) Appl. No.: 14/246,292

(22) Filed: Apr. 7, 2014

(65) Prior Publication Data

US 2015/0289117 A1   Oct. 8, 2015

(51) Int. Cl.
*H04W 4/14* (2009.01)
*H04L 29/08* (2006.01)

(52) U.S. Cl.
CPC ............... *H04W 4/14* (2013.01); *H04L 67/104* (2013.01)

(58) Field of Classification Search
CPC .............................. H04W 4/14; H04L 67/104
See application file for complete search history.

(56) References Cited

U.S. PATENT DOCUMENTS

2012/0106391 A1*   5/2012   van Loon ............ H04L 12/1886
                                                                370/252

* cited by examiner

*Primary Examiner* — Chuong A Ngo (57) ABSTRACT

An access platform of a service provider storing at least one group identifier and a list of subscriber numbers of subscriber devices associated with the at least one group ID. The access platform receives a group ID and a message from a customer application running on a customer device. The access platform then compares the received group ID to the at least one group ID stored, and in response to the received group ID matching the at least one stored group ID utilizes the list of subscriber numbers associated with the received group ID to deliver the received message to the subscriber devices.

20 Claims, 9 Drawing Sheets

```
Line
  1    <?xml version='1.0' encoding="UTF-8'?>
       <S:Envelope xmlns:S="http://schemas.xmlsoap.org/soap/envelope/">
       <S:Header>
         <ns3:TransactionID xmlns:ns3="http://vzw.com/schema">gmdm_1321991978943</ns3:TransactionID>
  5    </S:Header>
       <S:Body>
         <ns3:SubmitGroupMsgStatusReq xmlns:ns3="http://vzw.com/schema">
           <ns3:SrcAddr>110000011000</ns3:SrcAddr>
           <ns3:GroupID>1000</ns3:GroupID>
 10        <ns3:Content>Hello World</ns3:Content>
           <ns3:BatchScheduled>60</ns3:BatchScheduled>
         <ns3:SubmitGroupMsgReq>
       </S:Body>
       </S:Envelope>

15    <?xml version='1.0' encoding="UTF-8'?>
       <S:Envelope xmlns:S="http://schemas.xmlsoap.org/soap/envelope/">
       <S:Header>
         <ns3:TransactionID xmlns:ns3="http://vzw.com/schema">gmdm_1321991978943</ns3:TransactionID>
       </S:Header>
       <S:Body>
 20      <ns3:SubmitGroupMsgRsp xmlns:ns3="http://vzw.com/schema">
           <ns3:SrcAddr>110000011000</ns3:SrcAddr>
           <ns3:GroupID>10001</ns3:GroupID>
           <ns3:GMID></ns3:GMID>
         <ns3:SubmitGroupMsgRsp>
 25    </S:Body>
       </S:Envelope>
```

FIG. 7

```
Line
 1   <?xml version='1.0' encoding='UTF-8'?>
     <S:Envelope xmlns:S="http://schemas.xmlsoap.org/soap/envelope/">
     <S:Header>
     <ns3:TransactionID xmlns:ns3="http://vzw.com/schema">gmdm_1234567</ns3:TransactionID>
 5   </S:Header>
     <S:Body>
        <ns3:DeliverGroupStatusReq xmlns:ns3="http://vzw.com/schema">
            <ns3:GMID>10001</ns3:GMID>
            <ns3:Count>1000</ns:Count>
10          <ns3:GroupStatus>
                <ns3:Status mid="100000000" mdn="4085551234">Network Accepted</ns3:Status>
                <ns3:Status mid="100000001" mdn="4085552234">Delivered</ns3:Status>
                <ns3:Status mid="100000002" mdn="4085553234">Delivered</ns3:Status>
            </ns3:GroupStatus>
15      </ns3:DeliverGroupStatusReq>
     </S:Body>
     </S:Envelope>

<?xml version='1.0' encoding='UTF-8'?>
     <S:Envelope xmlns:S="http://schemas.xmlsoap.org/soap/envelope/">
     <S:Header>
20      <ns3:TransactionID xmlns:ns3="http://vzw.com/schema">gmdm_1234567</ns3:TransactionID>
     </S:Header>
     <S:Body>
        <ns3:DeliverGroupStatusRsp xmlns:ns3="http://vzw.com/schema">
            <ns3:RespStatus>OK</ns3:RespStatus>
        </ns3:DeliverGroupStatusRsp>
25   </S:Body>
     </S:Envelope>
```

FIG. 8

```
Line
 1   <?xml version='1.0' encoding="UTF-8"?>
     <S:Envelope xmlns:S="http://schemas.xmlsoap.org/soap/envelope/">
       <S:Header>
         <ns3:TransactionID xmlns:ns3="http://vzw.com/schema">gmdm_56789</ns3:TransactionID>
 5     </S:Header>
       <S:Body>
         <ns3:PollGroupMsgStatusReq xmlns:ns3="http://vzw.com/schema">
           <ns3:GMID>10001</ns3:SrcAddr>
         </ns3:PollGroupMsgStatusReq>
10     </S:Body>
     </S:Envelope>

<?xml version='1.0' encoding="UTF-8"?>
     <S:Envelope xmlns:S="http://schemas.xmlsoap.org/soap/envelope/">
       <S:Header>
15       <ns3:TransactionID xmlns:ns3="http://vzw.com/schema"> gmdm_56789</ns3:TransactionID>
       </S:Header>
       <S:Body>
         <ns3:PollGroupMsgStatusRsp xmlns:ns3="http://vzw.com/schema">
           <ns3:GMID>10001</ns3:GMID>
20         <ns3:Count>1000</ns:Count>
           <ns3:GroupStatus>
             <ns3:Status mid="100000004" mdn="4085554234">Network Accepted</ns3:Status>
             <ns3:Status mid="100000005" mdn="4085555234">Delivered</ns3:Status>
             <ns3:Status mid="100000007" mdn="4085556234">Delivered</ns3:Status>
25         </ns3:GroupStatus>
         </ns3:PollGroupMsgStatusRsp>
       </S:Body>
     </S:Envelope>
```

EFFICIENT GROUP MESSAGE DELIVERY METHOD FOR A2P AND M2M

BACKGROUND

In recent years, mobile wireless communications have become increasingly popular. Initial implementations of mobile wireless communications, for example in the form of cellular telephone networks, supported circuit switched voice communication services. Mobile voice telephone communication is now ubiquitous in many countries, and mobile services are replacing fixed landline service even for traditional voice telephone calls. However, for many years now the mobile service offerings have extended far beyond the traditional voice telephone call model. For example, the mobile carriers developed short messaging service (SMS) technology to provide text and/or email communications via the wireless communication networks. As the public wireless communication networks have evolved to provide greater bandwidth and packet based services, the industry has developed a variety of data services, such as web browsing, as well as a variety of services using multimedia messaging service (MMS) technology. Many of the messaging services such as SMS and MMS support message traffic between mobile stations, e.g. for message exchange between users. However, these popular messaging services also support traffic between mobile stations and server equipment from which service providers offer users a variety of different types of application services. With the increased data communication capability of the network and the associated increased intelligence of the mobile devices, mobile messaging has extended to include instant messaging and email, services. These messaging services support communications of messages between mobile devices as well as two-way communications between mobile devices and applications running on network-connected computer platforms, such as servers running appropriate applications.

For most message traffic, the communication is point-to-point, e.g. from one mobile device to another mobile device, even if an intermediate server computer provides a store-and-forward function in support of message delivery. Companies and other organizations, however, may have the need to multicast (i.e. sequentially transmit a message to multiple recipients) a message to a group of mobile devices in various situations. The multicast may be directed to many mobile devices that are listed in a group distribution list. For example, a bank may send a security alert or update to their account holders. The security alert may be sent in a multicast fashion to each individual mobile device. This multicast transmission is a sequential transmission from the server to each mobile device specified in the group, as opposed a unicast transmission where the data would be transmitted from the server directly to a single specified mobile device. As another example, a school system may need to notify teachers, other employees and parents, of a school system closing due to inclement weather.

However, in current multicast methods, the message may only be delivered to a short list of mobile devices since the multicast is performed by the sending enterprise itself. This limitation on the number of mobile devices is primarily due to hardware/software limitations in the systems of the sending enterprise. The bank in this example would have to send a message in a sequential manner to each individual mobile device, thereby consuming valuable resources and a large amount of time in delivering the messages. Furthermore, the bank would have to receive (on an individual basis) a status message from each of the mobile devices indicating whether the mobile device has received a message or not.

The conventional solution to performing multicast messaging to a large number of mobile devices is inefficient since it places the large burden of delivering the messages on the customer (i.e., the bank or school system in our examples). Each sending customer has to have complex hardware/software systems in place to perform this multicast in a sequential manner (e.g. phone number by phone number basis) to each of the recipients in the group. This can result in long delay times in transmitting multicast messages to groups of recipients, and require large capital investments by the customers to purchase and maintain such hardware/software systems.

BRIEF DESCRIPTION OF THE DRAWINGS

The features of subject technology are set forth in the appended claims. However, for purposes of explanation, several examples of the subject technology are set forth in the following figures.

FIG. 8 shows an example of XML code corresponding to the delivery of a group status message.

DETAILED DESCRIPTION OF THE INVENTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it should be clear and apparent that the subject technology is not limited to the specific details set forth herein and may be practiced without these specific details. In some instances, well-known structures and components are shown in block diagram form in order to avoid obscuring the concepts of the subject technology.

The detailed description below also uses a number of terms with respect to various system components and operations. Although generally known, use of several of these terms may not be strictly standardized in the art. For the convenience of the reader, the following definitions for some of the relevant terms are presented, as used by way of example in the detailed description below.

The terms "service" and "web service" are used interchangeably herein to refer broadly and inclusively to any unit of software functionality that is exposed to at least one other service, application, or system on a local area network, wide area network, or even a single process. For example, such functionality of the web service may be provided to one or more clients via an interface described in a machine-readable format, for example, the Web Services Description Language (WSDL). A web service generally passes messages (e.g., requests and responses) to and from clients as a form of communication through the communication network. Furthermore, the communication network can include the Internet or World Wide Web, and the service can be a web service hosted at a server configured to exchange communication with clients over the Internet.

A service that uses messages in an extensible markup language (XML) format is typically referred to as an "XML service." An example of a commonly used network communication protocol that uses messages in XML format is the Simple Object Access Protocol (SOAP). Services that use the SOAP protocol are often called SOAP services. For example, a SOAP service may define a message envelope that contains a header portion and a body portion. Further, each SOAP message may be included or wrapped in a Hyper-Text Transfer Protocol (HTTP) message for communication over the Internet. Additional features and characteristics of services using XML formatted messages with SOAP and HTTP would be apparent to a person skilled in the relevant art given this description.

An application programming interface (API) can refer to a process providing an interface for (or access to) one or more web services. The API can be executable code used for accessing a single web service, and/or for accessing two or more web services through routines providing additional functionality over the functionality of the individual web services.

An API is a set of programming functions and/or code provided by a first party to a second party so that the second party may incorporate functionality of the API into applications of the second party. Alternatively, or in addition, an API is a specification of remote calls available to a programmer. Location-based services (LBS) refers to services offered to commercial or private users (as opposed to government entities for e911), to obtain information as to location of a specified mobile station.

In general, Application to Person communication or (A2P) allows customers to provide communication processes using real-time interactive messages with various subscribers (i.e. persons subscribing to services provided by the customer). This A2P communication is in part performed by Machine to Machine (M2M) communication which provides data communication between the actual machines (e.g. mobile devices) through various devices of a network where data can be reviewed by the customers and/or subscribers.

Figure 1:
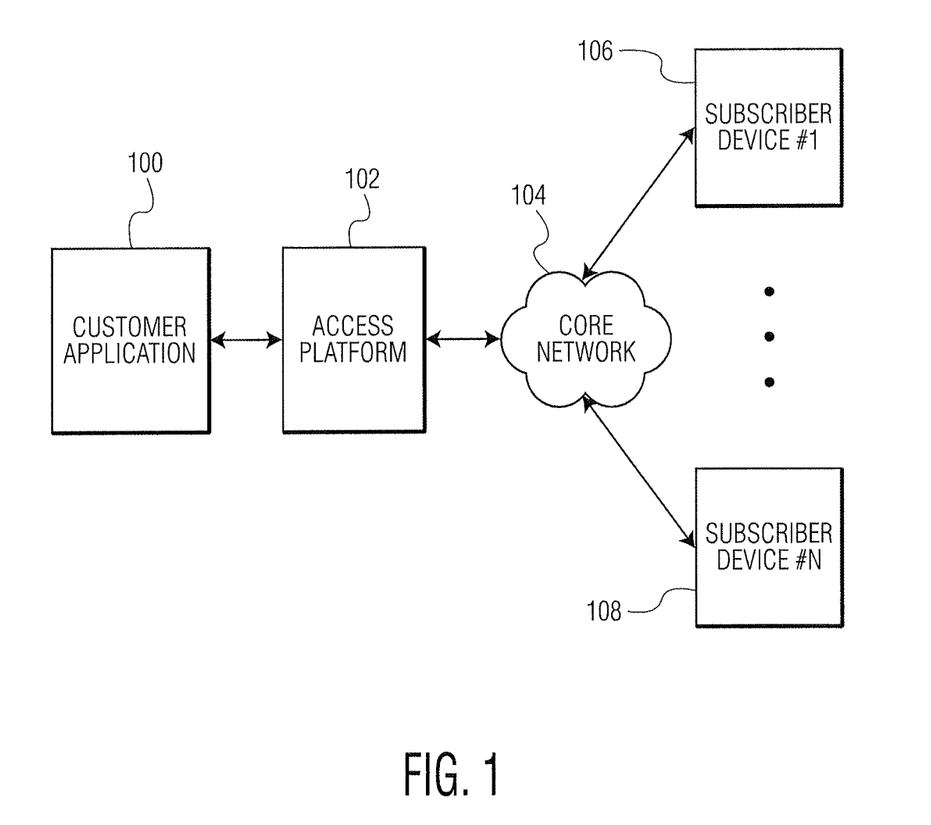
FIG. 1 shows an example of a network flow diagram for performing group message delivery from a customer application to subscriber devices.

In one example, some customers may provide group messaging services to a plurality of subscriber devices. These subscribers may be associated with a group that all receive the same message from the customer device during a group message delivery. FIG. 1 shows a network block diagram of a system capable of performing group message delivery from an enterprise customer application 100 to various subscriber devices 106. Shown in FIG. 1 is a customer device that runs application 100, the customer device may be a server or the like of an entity, e.g. a company or another organization (e.g. Twitter™), that wants to provide a group message delivery service to its subscribers (e.g. Twitter™ account holders).

Access platform 102 is a device (including at least a communication interface, memory and a processor) that is operated by a communication service provider (e.g. Verizon™) who provides the group message delivery service to customer device 100 and various customer devices (not shown) through an application programming interface (API) based on the Simple Object Access Protocol (SOAP) web service. Access platform 102 is usually owned by the carrier and sits near the edge of the core network 104 to interwork with customer application servers (e.g. device 100 in FIG. 1) that have authentication protocol and policy controls in place. For routing, delivery and processing messages over different types of core networks (e.g. CDMA, GSM, LTE, WiFi, etc.), access platform 102 interworks with different core network elements such as routers, gateways, etc., (not shown). The API exposes the network capabilities such as SMS, MMS and LBS (location based service) for business customers.

Cloud 104 is a core network that separates the access platform device from various subscriber devices 106 which may be mobile devices having mobile device numbers, personal computers and any other electronic device that is able to receive messages such as SMS, MMS, email, etc. In general, the enterprise operating customer device 100 may be a corporation or an entity such as a bank, transportation authority, automotive manufacturer, social media provider, government department or agency, etc. that wants to send a message in multicast form to a large number of subscriber devices (i.e. devices subscribed to messaging services provided by the customer application). The users of subscriber devices 106 may be employees, customers or other users associated in some manner with the particular enterprise. For example, a bank may need to send an alert or security update to users of various subscriber devices. In another example, a transportation authority may need to send train schedule updates or delay notifications to customers/passengers that are going to be riding on the trains. In this example, the customers may be persons and/or organizations that have signed up using their personal information to receive message services from the transportation authority on their mobile phones as text messages or email messages. In yet another example, an automotive manufacturer may need to send software security patches for various vehicles. In these various examples, the customer device 100 sends the message to access platform 102. Access platform 102 then delivers the message to the identified subscriber device(s) 106 (e.g. mobile devices).

Figure 2:
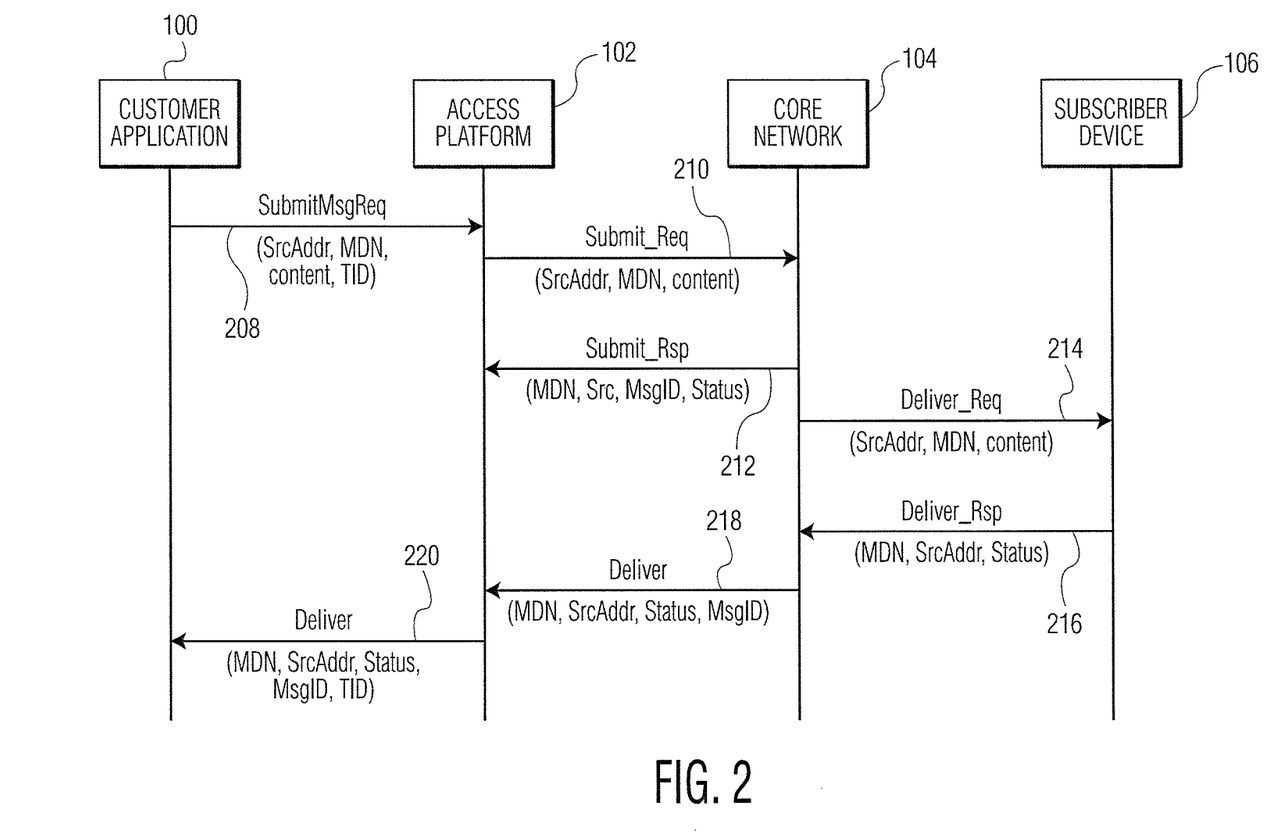
FIG. 2 shows message detail of the group message delivery being performed by the devices in FIG. 1.

An example of sending a message from a customer device 100 to a subscriber device 106 is shown in FIG. 2. Specifically, customer application 100 may submit a message request to access platform 102 (labeled SubmitMsgReq). The message request 208 may include the source address (SrcAddr), a subscriber device number such as the assigned mobile directory number (MDN), the content of the message as well as other information such as a tunnel identifier (TID). Access platform 102 may then send a submit request 210 to core network 104, including some or all of the information from the request 208. Core network 104 may respond with a submit response 212 where Src is the source address such as the sender device MDN, and where MsgID is a message ID for each delivery which is generated by the core network for the access platform and the applications to tie the sent messages to their respective delivery receipts, and may then send a delivery request 214 to subscriber device 106 which then responds with a delivery response 216. Delivery response 216 may include status information as to whether the message has actually been received by subscriber device 106. Core network 104 may then send a delivery message 218 to access platform 102 which is then forwarded back to customer application 100 via message 220. It is noted that the various message parameters (e.g. SrcAddr, MDN, MsgID, Status, TID, etc.) are similar throughout the various messages shown in FIG. 2 with some slight format variations.

In the example shown in FIG. 2, if the entity wants to send the same message to some number of end user devices 106, the customer application 100 has to sequentially send a submit message request for each and every subscriber device 106 that it wishes to send the message to (i.e., the customer device 100 has the burden of sending many message requests to the access platform and waiting for the status of the delivery through the access platform in a sequential manner). Platform 102 and core network 104 repeat the process steps shown for each copy of the message and associated destination device 106, separately, essentially multiplying the work load per message by the number of intended destination devices.

The sequential multicast technique described herein shifts the burden from customer application 100 to access platform 102. Specifically, customer application 100, during a registration process prior to the multicast, may send a list of subscriber device numbers (e.g. mobile telephone numbers) it wishes to send one or more messages to in the future. Access platform 102 stores these subscriber device numbers in a table and associates these subscriber device numbers with a group ID. The group ID may associate a potentially large number (hundreds or thousands) of subscriber devices with a particular group. The access platform then sends this group ID back to customer application 100.

After the registration process, to send a message to the subscriber devices in the group, customer application 100 sends the group ID to access platform 102 along with the content of the message. Access platform 102 then looks up the group ID in the table (e.g. compares the received group ID to a plurality of group IDs stored in the table) and finds the subscriber device numbers that are associated with the group ID. Access platform 102 then sequentially performs the message delivery for each of the subscriber devices that are listed with respect to the group ID. For example, a customer may store a number of pre-established group lists with different group IDs. The customer may then select one of the IDs and generate a message that is to be sent to the members of the group. The customer may then forward the selected ID and the message to the access platform for group message delivery. The access platform uses the group ID to determine the appropriate subscribers to whom to send the message. Once the messages are delivered to the subscriber devices, the access platform can then send a single group status message identified by a group ID back to the customer application 100 indicating the number of subscriber devices that have received the message. This process essentially places the burden on the access platform 102 through generation and management of the group ID table, as well as providing various messaging services (e.g. SMS, MMS, LBS, etc.) to subscriber devices on behalf of the customer.

Figure 3:
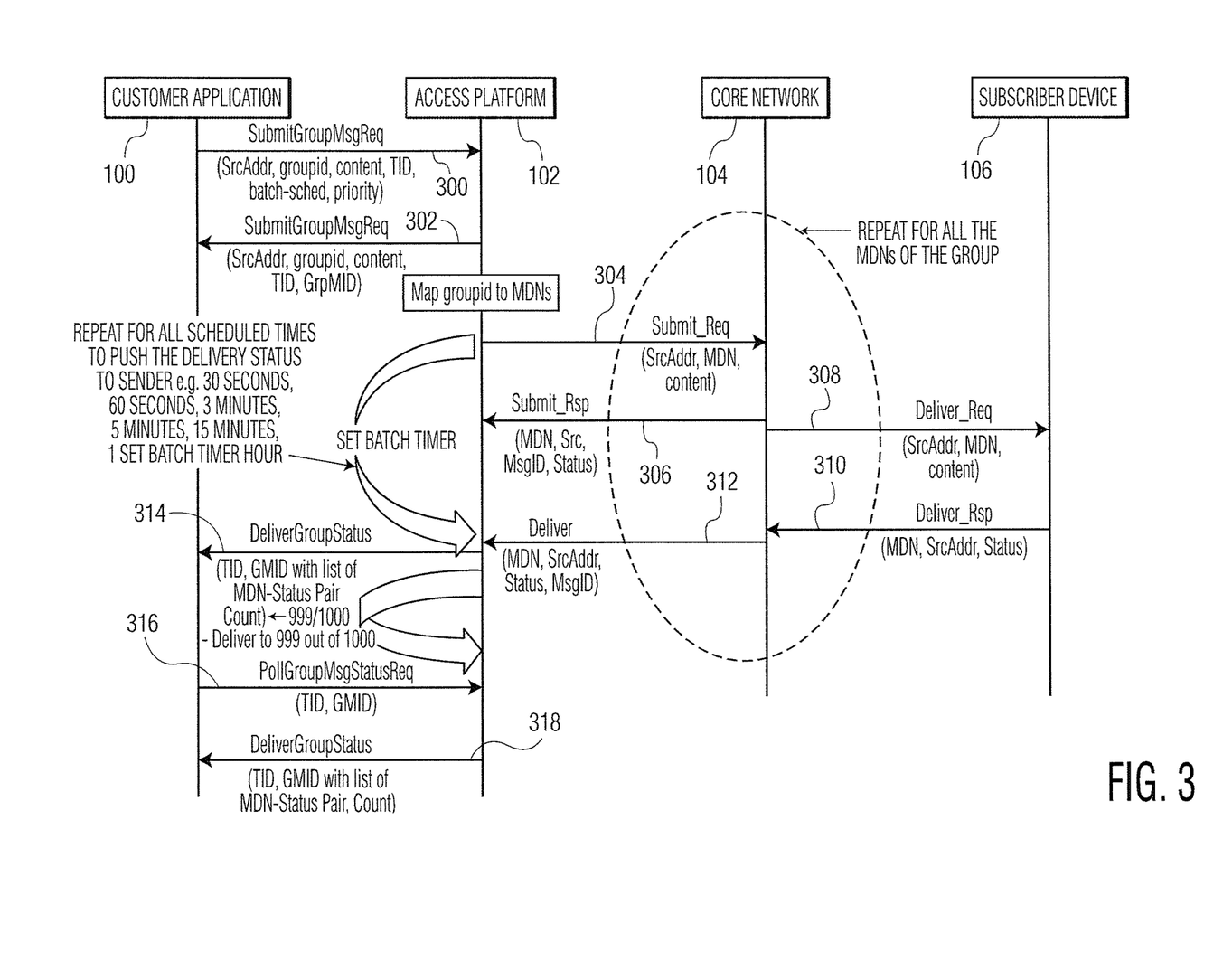
FIG. 3 shows another flowchart of message detail for performing group message delivery between the devices shown in FIG. 1.

An example of this messaging scheme between customer application 100 and the subscriber device 106 is shown in FIG. 3. Specifically, after registration (not shown) of the subscriber device numbers on access platform 102, customer application 100 sends a submit group message request 300 which includes a group ID to access platform 102. Access platform 102 then responds to customer application 100 with a submit group message response 302. This response may include a group ID utilized by access platform 102 in the table. In messages 304, 306, 308, 310 and 312, access platform 102 transmits the message request to core network 104 and receives responses from the subscriber devices, including, as shown, subscriber device 106. Specifically, in message 304, the submit request may be sent to core network 104 for one of the subscriber devices. Core network 104 may then respond to access platform 102 with a submit response 306. Core network 104 may then transmit delivery request message 308 to a particular subscriber device 106, and receive a delivery response 310 from that subscriber device. This delivery response may then be sent from core network 104 back to access platform 102.

These five steps are generally repeated for each individual subscriber device (i.e. each respective MDN) that is listed in the group table. In response to a delivery message 312, which may include status information from each subscriber device, access platform 102 edits the group table with status information. This status information indicates whether a particular subscriber device has received the message. If the subscriber device does not receive the message, network elements in core network 104 will retry sending the message to the subscriber device according to retry schedules in place (e.g. 5 minutes, 15 minutes, 1 hour, etc.). There may also be a max retry time specified such as 5 days where the core network will not retry sending the message anymore to that unattainable subscriber device.

In one example, access platform 102 waits a predetermined amount of time and send the group delivery status message 314 to customer application 100. The group status message 314 includes a list of all the subscriber devices that have received the message. This group status delivery message may be delivered periodically to the customer application (e.g., 30 seconds, 60 seconds, 3 minutes, 5 minutes, 15 minutes, 1 hour).

This periodicity for delivering the group status message may be set according to various factors such as customer requirements/requests that may be based on the content/urgency of the message, the particular group designated in the message, etc. For example, in a public service scenario, the customer may specify that the group status delivery messages should be sent more frequently for urgent messages (e.g. natural disaster warnings), as opposed to less urgent messages (e.g. test messages), and for more important groups (e.g. persons in imminent danger), as opposed to less important groups (e.g. persons further away from the pending disaster). The periodicity may also be set according to a percent of subscriber devices within the group that the access network has reached with a successful message delivery. For example, the access platform may wait until a minimum number of group subscribers (e.g. 80%) have been reached successfully, before reporting the group status.

Essentially, access platform 102 collects many status messages from many destination subscriber devices, and then sends this status information in a single message 314 back to customer application 100 in a periodic manner as described above. The updated status messages provided by access platform 102 may include all of the subscriber devices that have received the message, or only the latest subscriber devices (e.g. the subscriber devices that received the message after the initial status message was already transmitted) that have received the messages. Similar to the initial status message, the transmission time of the updated status message may also be controlled based on message urgency, group importance, customer requests, access platform hardware/software limitations, etc. For example, the initial status message may be sent when 80% of the subscribers received the message. The updated status message may then be sent when 90% of the subscribers have received the message. Further updated status messages may then be sent when even higher percentages of the subscriber devices have received the message.

Alternatively or in conjunction with the status message, customer application 100 may also have a polling operation where it can poll access platform 102 for status information. In this later example, customer application 100 transmits a polling request 316 for a particular group ID, at some point after it requested delivery to the group ID. The time for transmitting the polling request may be selected by the customer application as a predetermined amount of time after requesting to transmit the message to the subscriber devices. For example, if a long period of time passes, and a group status message has not been received, the customer device may send the polling request to force the access platform to transmit the group status message. Access platform 102 may then retrieve the status information from the table stored in memory and deliver this group status information along with the associated group ID in message 318. This allows the customer application 100 to request group status information at any time, as long as the access platform is available for such a transmission. It is noted that the polling request can be the sole method for obtaining the group status message, or it can be used in conjunction with periodic transmission of the group status message (e.g. the customer may send the polling request in between periodic transmissions of the group status message from the access platform).

In the example where the group status message 315 is sent from access platform 102 to customer application 100, it is noted that access platform may introduce its own algorithm to provide batch group delivery status information to the customer application. This batch group status delivery status may include adjustable timers for each individual customer application. These timers may be based on customer business needs and other parameters. The timer and party can be set to various schedules or a default may be applied.

Figure 4:
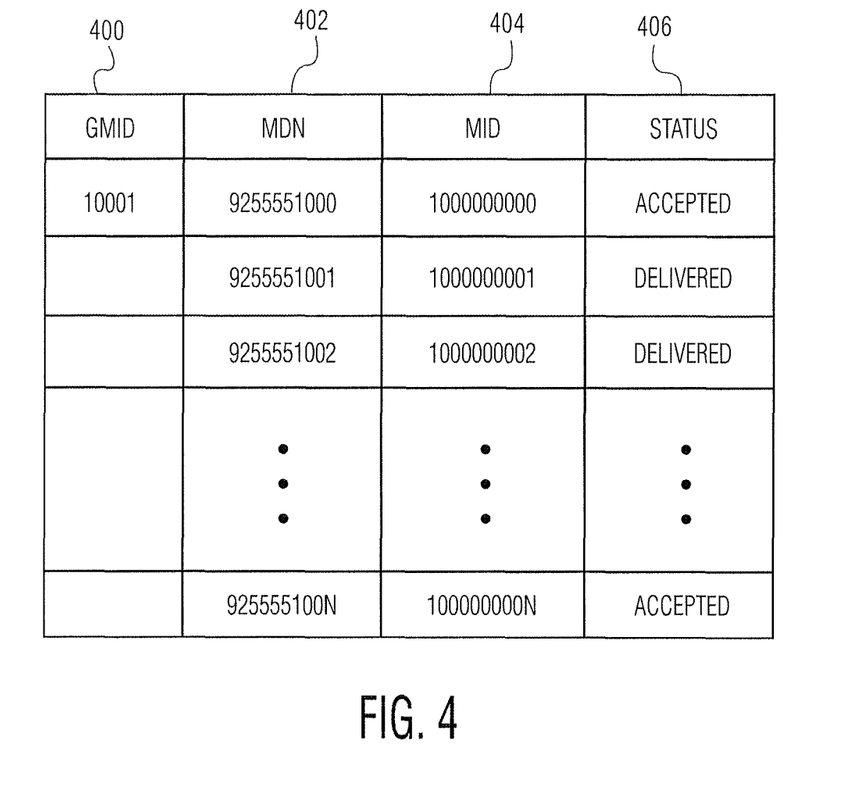
FIG. 4 shows a table of subscriber device numbers associated with a group identifier (ID).

The table described above may include various pieces of information including but not limited to subscriber device numbers and various group IDs associated with the subscriber device numbers. FIG. 4 shows an example of a group message delivery table. This group message delivery table includes a column 400 which indicates a group ID. Column 402 shows various subscriber device numbers that are associated with the group ID. Column 404 shows various subscriber index numbers that are associated with each of the subscriber numbers in column 402. Column 406 shows status information for each of the subscriber devices with respect to a particular message being sent from the customer application.

Thus, during registration, the access platform 102 generates the table shown in FIG. 4 including the group ID, the subscriber numbers associated with the group ID and the index numbers. As the message status information is received from the various subscriber numbers during the delivery process, access platform 102 edits column 406 in the table shown in FIG. 4 to indicate whether the message has been delivered or the message is still in the network. Although not shown, the table may also include various other group IDs associated with other customers and/or subscriber devices. In general, the access platform may look up a received group ID and compare it to various group IDs stored in the table to find a match.

Figure 5:
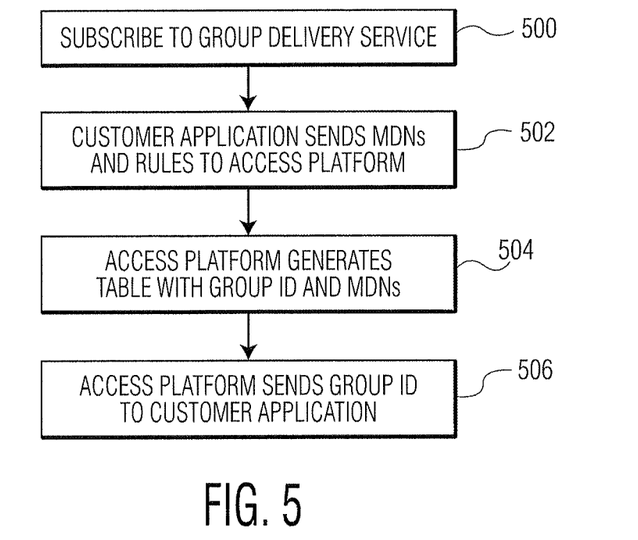
FIG. 5 shows a flowchart of a customer registering with the access platform and generating a table with subscriber numbers associated with the group ID.

FIG. 5 shows a high level flowchart of a process for performing registration and table generation between customer application 100 and access platform 102. In step 500, the customer application 100 subscribes to the group delivery service being provided by access platform 102. This subscription generally uses the customer entity to provide monetary consideration, e.g. agreement to pay or actual pre-payment, for being subscribed to the group delivery service. In step 502, once the subscription operation is complete, customer application 100 may then register a group with access platform 102 by sending subscriber device numbers of a particular group to access platform 102. In step 504, access platform 102 may then generate the group message table as shown in FIG. 4 which includes a group ID associated with the various subscriber device numbers received from customer application 100. In step 506, access platform 102 may send the generated group ID back to customer application 100. This allows customer application 100 to utilize the generated group ID to send a message to all the subscriber device numbers associated with the group ID.

Although not shown, customer application 100 may also modify the list in FIG. 4 after it is created. Customer application 100 may remove or add subscriber numbers from the list. This may be performed automatically based on rules running on customer application 100 or manually by an operator controlling customer application 100 or when desired by the customer via a web site or the like allowing customer personnel to manage the customer's distribution list. In general, when the customer application wants to edit the group list, a message (not shown) may be sent from the customer application to the access platform with instructions for editing the group list.

Figure 6:
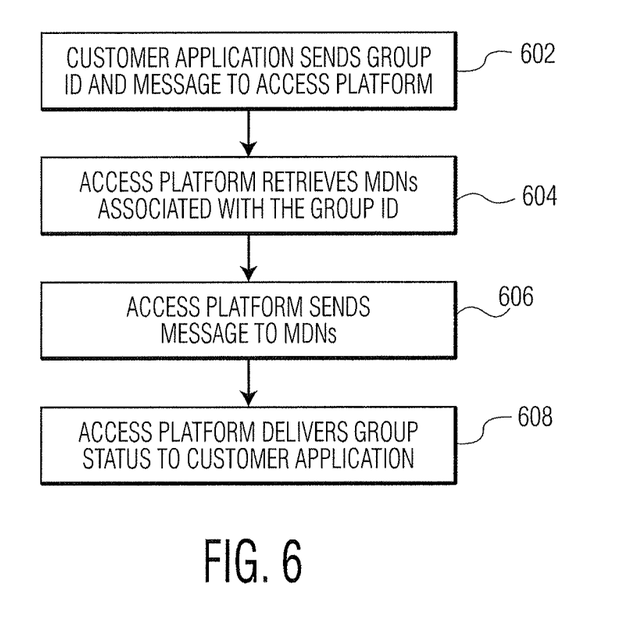
FIG. 6 shows a flowchart of the access platform receiving a request to transmit a multicast message to various subscriber devices associated with the group ID.

During operation, a customer device may want to deliver a message to a number of subscriber devices in an identified group. Shown in FIG. 6 is a high level flowchart of customer application 100 and access platform 102 sending a message to various subscriber devices associated with the group ID. In step 600, customer application 100 sends the group ID and a message to access platform 102. In step 602, access platform 102 looks up the subscriber device numbers that are associated with the received group ID. In step 604, access platform 102 performs a sequential multicast of the message received from customer application 100 to each of the subscriber devices that have subscriber device numbers associated with the group ID. In step 606, access platform 102 receives status information from the various subscriber devices, populates the group message table and sends a group status delivery message back to customer application 100. The group status message includes information of the subscriber devices that have, received the message or other subscriber devices that have not yet received the message. Although not shown in FIG. 6, customer application 100 may also poll access platform 102 for this group status information.

It is noted, that in one example, the group status message may include a number/percentage of successful deliveries within each respective group. In another example, the group status message may include the actual MDNs that have successfully received the message, and the actual MDNs that have not received the message. For example, the initial group status message may be automatically sent from the access platform to the customer application indicating a percentage of successful deliveries in the group. After the initial group status message, the customer application may poll the access platform for more specific information such as the actual MDN numbers that have successfully and/or unsuccessfully received the message.

It is also noted that the table shown in FIG. 4 may include a number (not shown) representing the number of attempted deliveries to each MDN. This number may be included in the group status message, thereby indicating the number of attempts to the customer application.

Various functions of the customer application, access platform and subscriber devices shown in FIG. 1 and described above can be implemented in digital electronic circuitry, in computer software, firmware or hardware (e.g., microprocessor, FPGA, RAM, ROM, etc.). The techniques can be implemented using one or more computer program products. Programmable processors and computers can be included in or packaged as subscriber devices. The processes and logic flows can be performed by one or more programmable processors and by one or more programmable logic circuitry. General and special purpose computing devices and storage devices can be interconnected through communication networks.

Figure 7:
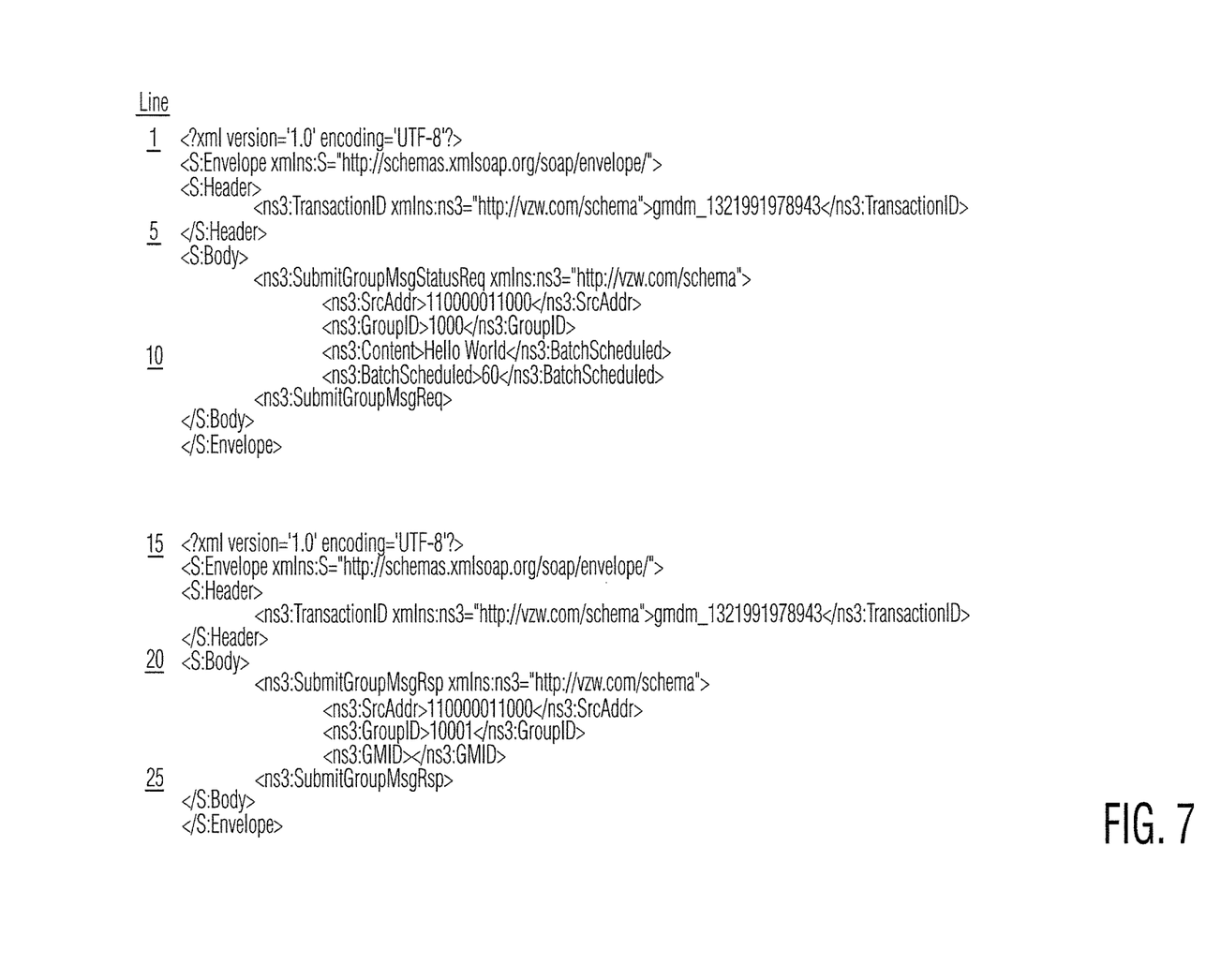
FIG. 7 shows an example of XML code corresponding to the submission of a group message.
Figure 9:
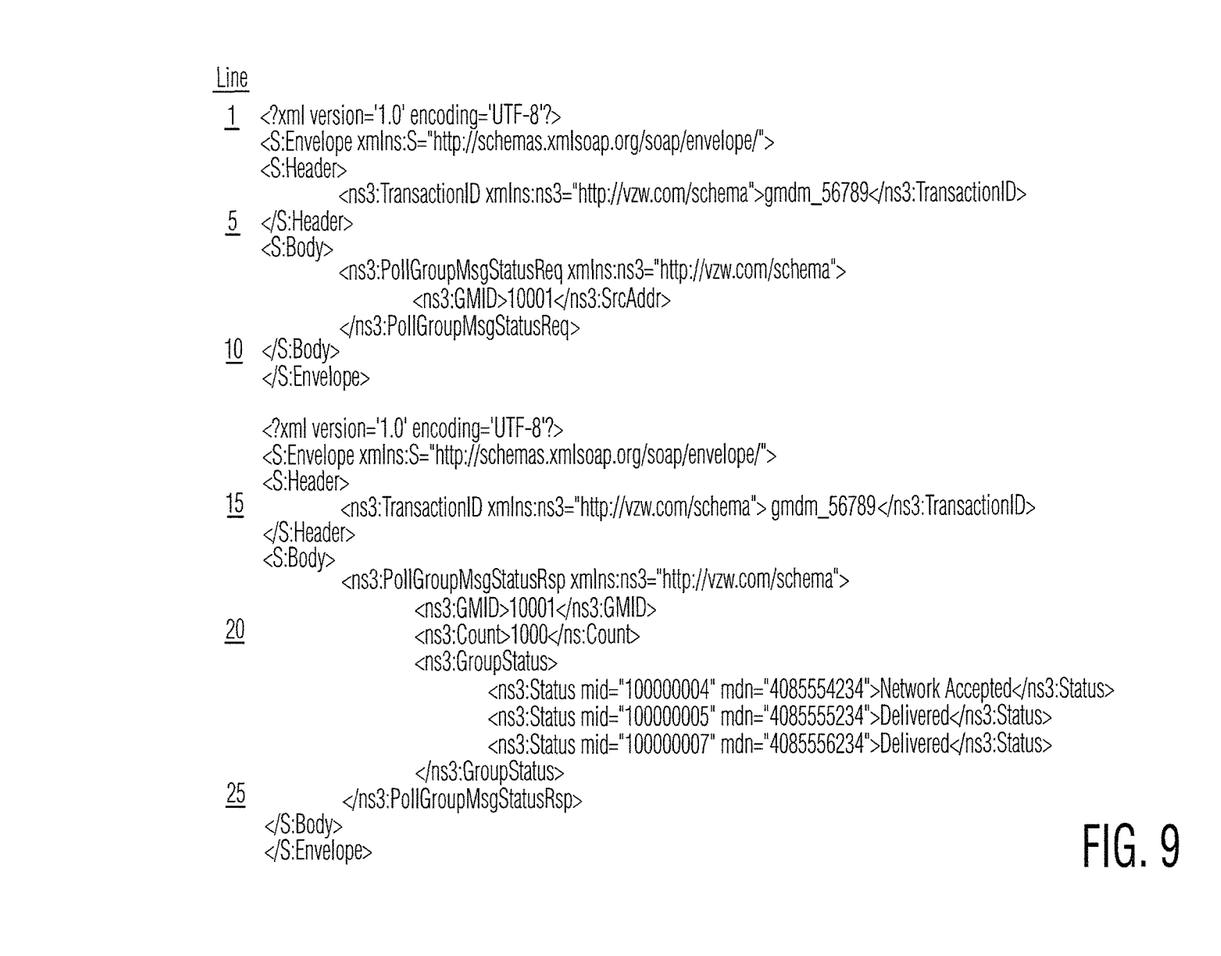
FIG. 9 shows an example of XML code corresponding to the polling for a group status message.

FIGS. 7, 8 and 9 provide examples of XML code for performing several steps of the group messaging methods shown in FIGS. 2 and 3. It is noted that FIGS. 7, 8 and 9 are examples for explanatory purposes, and are not meant to limit the invention to XML code, or any particular coded implementation.

FIG. 7 shows XML code for submitting a group message request from the customer application to the access platform, and then sending a group message response from the access platform back to the customer application (see messages 300 and 302 in FIG. 3). In lines 1-5 and 15-19, a SOAP protocol is chosen for the message and a transaction ID is generated for the group message request and response respectively. In lines 6-14, the source address of the customer application, the Group ID and the content of the message are specified in commands to submit the group message request to the access platform. In lines 20-27, the source address of the customer application, the Group ID and the GMID of the message are specified in a command to submit the group message response to the customer application.

FIG. 8 shows XML code for submitting a group status request from the access platform to the subscriber devices, and submitting a group status response from the subscriber devices back to the access platform (see message 14 in FIG. 3). In lines 1-5 and 18-21, a SOAP protocol is chosen for the message and a transaction ID is generated for the status request and response respectively. In lines 6-14, the GMID, Count and the group numbers are specified in commands to submit the group status message request to the subscriber devices. In lines 20-27, the status of the groups is specified in a command to submit the group message status response from the access platform back to the customer application.

FIG. 9 shows XML code for submitting a poll group status request from the customer application to the access platform, and then sending a poll group status response from the access platform back to the customer application (see messages 316 and 318 in FIG. 3). In lines 1-5 and 12-16, a SOAP protocol is chosen for the message and a transaction ID is generated for the poll request and response respectively. In lines 6-11, the GMID is specified in commands to submit the poll group status message request to the access platform. In lines 17-28, the status of the groups is specified in a command to submit the poll group message status response to the customer application.

As shown by the discussion above, aspects of the group message delivery service may be implemented on an access platform or other similar equipment of a messaging service provider, such as a mobile network operator. Although such a platform may be implemented using purpose built hardware, it is also contemplated that such a platform may be implemented by appropriate configuration/programming of a general purpose computer, gateway, router, or the like.

Figure 10:
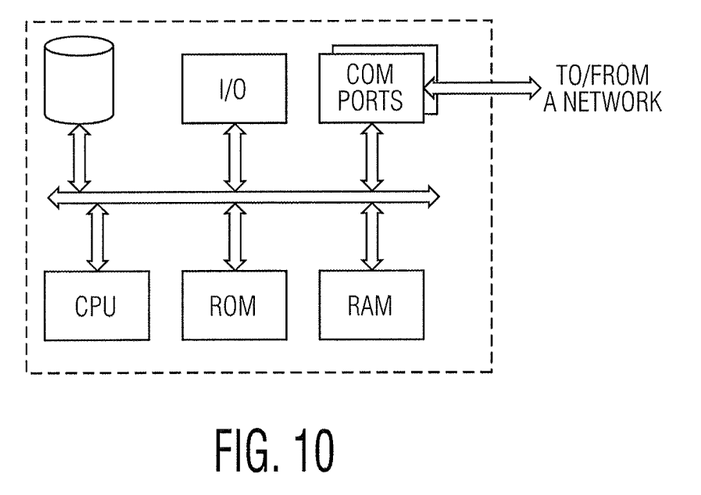
FIG. 10 shows a block diagram of a general purpose computer hardware platform that may be configured as a host or server.
Figure 11:
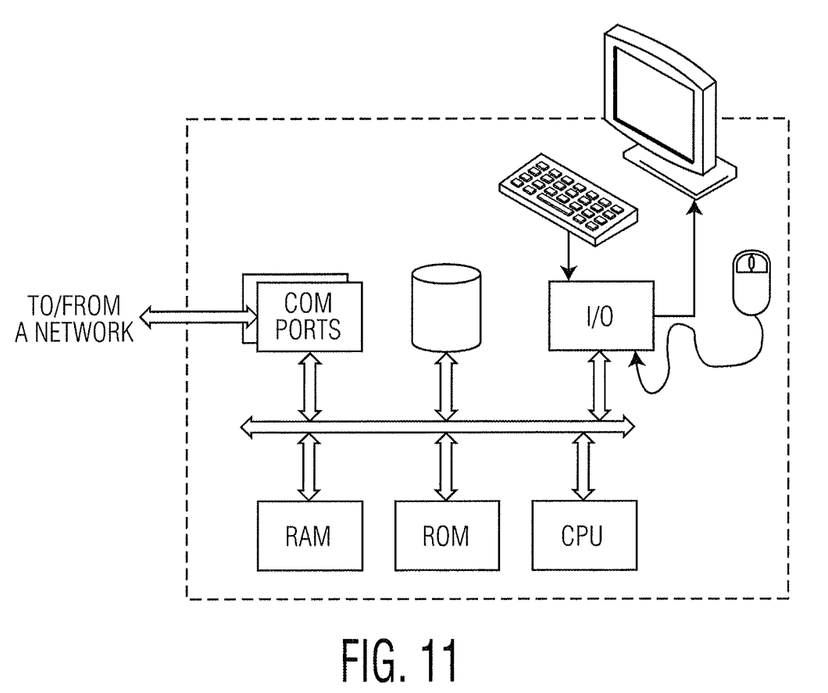
FIG. 11 shows another block diagram of another general purpose computer hardware platform that may be configured as a personal computer, other work station or type of user terminal device.

FIGS. 10 and 11 provide functional block diagram illustrations of general purpose hardware platforms. FIG. 10 illustrates a network or host computer platform, as may typically be used to implement a server or gateway, although a similar system optimized for message or packet handling may be used to implement a router or the like. FIG. 11 depicts a computer with user interface elements, as may be used to implement a personal computer or other type of work station or terminal device, although the computer of FIG. 11 may also act as a server if appropriately programmed. It is believed that the general structure and general operation of such equipment as shown in FIGS. 10 and 11 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

The subscriber devices 106 may be mobile devices or other types of user terminal devices. A computer type user terminal device, such as a PC or tablet computer, similarly includes a data communication interface CPU, main memory and one or more mass storage devices for storing user data and the various executable programs. A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of sending group messages outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the access platform. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the subscriber devices, subscriber devices, access platform, devices within the core network, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A device, comprising:
   a memory storing a table that includes a plurality of group identifiers (IDs) and a list of subscriber numbers of subscriber devices associated with each group ID of the plurality of group IDs,
   each subscriber device, of the subscriber devices, being subscribed to a messaging service provided by a customer application executing on a customer device; and
   a processor to:
   receive a group ID from the customer application and via the customer device;
   receive a message from the customer application and via the customer device;
   compare the received group ID to the plurality of group IDs included in the table in the memory;
   in response to the received group ID matching at least one group ID, of the plurality of group IDs, utilize a particular list of subscriber numbers, associated with the received group ID, to provide the message through a communication network to particular subscriber devices associated with the particular list of subscriber numbers;
   receive, from the particular subscriber devices, status messages indicating whether the message is received by the particular subscriber devices; and
   provide a group status message to the customer device after receiving the status messages from the particular subscriber devices,
   the group status message indicating a number of the particular subscriber devices that received the message.

2. The device of claim 1, where the processor is further to:
   generate the table in response to the customer device registering for a group message delivery service, the table including a reference number, associated with each subscriber number, and a delivery status associated with each subscriber number.

3. The device of claim 1, where, when providing the group status message, the processor is to:
provide the group status message to the customer device at a predetermined time after receiving the status messages from the particular subscriber devices.

4. The device of claim 3, where the processor is further to:
receive, from the customer device, a message requesting delivery of the group status message.

5. The device of claim 1, where, when providing the message, the processor is to:
sequentially provide the message to the particular subscriber devices.

6. The device of claim 1, where, when providing the message, the processor is to:
provide the message to the particular subscriber devices at a predetermined time.

7. The device of claim 1, where the processor is further to:
generate multiple tables of subscriber numbers for the customer device and for other customer devices.

8. A method, comprising:
storing, by a device, a table that includes a plurality of group identifiers (IDs) and a list of subscriber numbers of subscriber devices associated with each group ID of the plurality of group IDs,
each subscriber device, of the subscriber devices, being subscribed to a messaging service provided by a customer application executing on a customer device;
receiving, by the device, a message and a group ID from the customer application, and via the customer device;
comparing, by a device, the received group ID to the plurality of group IDs provided in the table;
in response to the received group ID matching at least one group ID, of the plurality of group IDs, utilizing, by the device, a particular list of subscriber numbers, associated with the received group ID, to provide the message to particular subscriber devices associated with the particular list of subscriber numbers;
receiving, by the device and from the particular subscriber devices, status messages indicating whether the message is received by the particular subscriber devices; and
providing, by the device, a group status message to the customer device after receiving the status messages from the particular subscriber devices,
the group status message indicating a number of the particular subscriber devices that received the message.

9. The method of claim 8, further comprising:
generating the table in response to the customer device registering for a group message delivery service,
the table including a reference number associated with each subscriber number, and a delivery status associated with each subscriber number.

10. The method of claim 8, further comprising:
providing the group status message to the customer device at a predetermined time after receiving the status messages from the particular subscriber devices.

11. The method of claim 10, further comprising:
receiving, from the customer device, a message requesting delivery of the group status message.

12. The method of claim 8, further comprising:
storing the status messages in the table.

13. The method of claim 8, where providing the message comprises:
providing the message to the particular subscriber devices at a predetermined time.

14. The method of claim 8, further comprising:
generating multiple tables of subscriber numbers for the customer device and for other customer devices.

15. A non-transitory computer readable medium for storing instructions, the instructions comprising:
one or more instructions that, when executed by one or more processors of a device, cause the one or more processors to:
store a table that includes a plurality of group identifiers (IDs) and a list of subscriber numbers of subscriber devices associated with each group ID of the plurality of group IDs,
each subscriber device being subscribed to a messaging service provided by a customer device;
receive a message and a group ID from the customer device;
compare the received group ID to the plurality of group IDs provided in the table;
in response to the received group ID matching at least one group ID, of the plurality of group IDs, utilize a particular list of subscriber numbers, associated with the received group ID, to provide the message to the particular subscriber devices associated with the particular list of subscriber numbers;
receive, from the particular subscriber devices, status messages indicating whether the message is received by the particular subscriber devices; and
provide a group status message to the customer device after receiving the status messages from the particular subscriber devices,
the group status message indicating a number of the particular subscriber devices that received the message.

16. The non-transitory computer readable medium of claim 15, further comprising:
one or more instructions that, when executed by the one or more processors, cause the one or more processors to:
receive, from the customer device, a request for utilizing a group message delivery service,
where the one or more instructions that cause the one or more processors to store the table include one or more instructions that, when executed by the one or more processors, cause the one or more processors to generate the table based on the request for utilizing the group message delivery service.

17. The non-transitory computer readable medium of claim 15, further comprising:
one or more instructions that, when executed by the one or more processors, cause the one or more processors to:
store the status messages, received from the particular subscriber devices in the table.

18. The non-transitory computer readable medium of claim 17, further comprising:
one or more instructions that, when executed by the one or more processors, cause the one or more processors to:
receive, from the customer device, a message requesting delivery of the group status message.

19. The non-transitory computer readable medium of claim 15, further comprising:
one or more instructions that, when executed by the one or more processors, cause the one or more processors to:
generate a plurality of tables for the customer device and for other customer devices.

20. The non-transitory computer readable medium of claim 15, where the message is provided to the particular subscriber devices at a predetermined time.

\* \* \* \* \*